(12) United States Patent
Anthoine

(10) Patent No.: US 7,621,569 B2
(45) Date of Patent: Nov. 24, 2009

(54) IMPLANTATION CARTRIDGE FOR A PIPE CONNECTION DESIGNED TO BE FITTED IN A HOUSING

(75) Inventor: Bernard Anthoine, Vetraz Monthoux (FR)

(73) Assignee: Parker Hannifin France SAS, Annemasse (FR)

( * ) Notice: Subject to any disclaimer, the term of this patent is extended or adjusted under 35 U.S.C. 154(b) by 301 days.

(21) Appl. No.: 11/628,728

(22) PCT Filed: Jul. 12, 2005

(86) PCT No.: PCT/FR2005/001803

§ 371 (c)(1),
(2), (4) Date: Feb. 23, 2007

(87) PCT Pub. No.: WO2006/016066

PCT Pub. Date: Feb. 16, 2006

(65) Prior Publication Data

US 2007/0296214 A1 Dec. 27, 2007

(30) Foreign Application Priority Data

Jul. 19, 2004 (FR) .................................. 04 07970

(51) Int. Cl.
*F16L 35/00* (2006.01)
*F16L 37/091* (2006.01)
(52) U.S. Cl. ............................ 285/340; 285/3; 285/39; 285/307; 285/308

(58) Field of Classification Search ...................... 285/3, 285/4, 39, 307, 308, 340
See application file for complete search history.

(56) References Cited

U.S. PATENT DOCUMENTS

| 5,096,235 | A | * | 3/1992 | Oetiker .................... 285/308 |
| 5,911,443 | A | * | 6/1999 | Le Quere ...................... 285/3 |
| 6,145,887 | A |   | 11/2000 | Cambot-Courrau |
| 6,517,124 | B1 | * | 2/2003 | Le Quere .................... 285/340 |
| 6,612,623 | B2 | * | 9/2003 | Salomon-Bahls ........... 285/308 |
| 6,783,161 | B2 | * | 8/2004 | Halama ..................... 285/308 |
| 7,063,359 | B2 | * | 6/2006 | Vallee ........................ 285/319 |
| 2002/0140226 | A1 |   | 10/2002 | Salomon-Bahls |
| 2003/0001383 | A1 | * | 1/2003 | Halama ...................... 285/39 |
| 2004/0070198 | A1 | * | 4/2004 | Rohrig ....................... 285/39 |
| 2004/0245766 | A1 | * | 12/2004 | Vallee ........................ 285/39 |

FOREIGN PATENT DOCUMENTS

| EP | 0 272 988 | 6/1988 |
| FR | 2 758 379 | 7/1998 |

* cited by examiner

*Primary Examiner*—James M Hewitt
(74) *Attorney, Agent, or Firm*—Oliff & Berridge PLC

(57) ABSTRACT

An implantation cartridge for a pipe connection designed to be fitted in a housing includes a body and a quick coupling, the inlet of the housing has an annular rim designed to form, with the pipe in the connection end position and when the cartridge is in an intermediate insertion position in its housing, a stop for limiting the axial travel of the push button so as to make the connection of the pipe to the cartridge irreversible.

8 Claims, 3 Drawing Sheets

IMPLANTATION CARTRIDGE FOR A PIPE CONNECTION DESIGNED TO BE FITTED IN A HOUSING

BACKGROUND

1. Technical Field

The present invention relates to an implantation cartridge for a pipe connection, for example a pneumatic connection, designed to be fitted in a housing, for example in a machine wall, in a connecting plate or else in a pneumatic cylinder.

2. Related Art

French patent No. 2 758 379 may be cited by way of example; it describes an implantation cartridge comprising
- a body of cylindrical general shape having a first opening connected to a duct and being provided with elastic teeth which extend radially outward, are inclined with respect to a radial plane toward a second opening provided for the introduction of a pipe to be connected, and are intended to be arranged preferably at the bottom of the housing; and
- a quick coupling for connecting the pipe to the cartridge, comprising an elastic ring having teeth which extend radially inward and come to bear against a shoulder formed on the inside of the cartridge body, a sleeve intended to keep the elastic ring in position, a seal to provide sealing between the outer surface of the pipe to be connected and the inner surface of the cartridge body, and an axially movable push button intended to act on the teeth of the elastic ring in order to be able to release a pipe retained in the connection.

The cartridge thus comprises a very reliable system for anchoring in a housing which may be formed equally well in a synthetic material or in a metal. On the other hand, it is not possible to remove the pipe by simply pulling on it in the axial direction, since the teeth of the elastic ring are anchored in the pipe and, when such a pulling force is exerted, these teeth produce a wedging effect. Only the push button makes it possible to act on the teeth of the elastic ring in order to release the pipe from their grip and allow the removal of said pipe.

However, this latter function of pipe removal needs to be neutralized for safety reasons when the connection is required to become permanent.

SUMMARY

The object of the present invention is therefore to solve this problem by providing an implantation cartridge for a pipe connection of the above-described type, comprising means for preventing any removal of the pipe to be connected and hence making the connection permanent.

To this end, the subject of the invention is an implantation cartridge of the aforementioned type, in which the inlet of the cartridge housing has an annular rim designed to form, with the pipe in the connection end position and when the cartridge is in an intermediate insertion position in its housing, a stop for limiting the axial travel of the push button so as to make the connection of the pipe to the cartridge irreversible.

Thus, before the cartridge reaches an intermediate insertion position in its housing, the connection between the pipe and the cartridge is, in a first operating mode of the cartridge, detachable by acting on the bush button.

By contrast, as soon as this intermediate insertion position has been reached, the push button butts against an annular rim formed at the inlet of the cartridge housing and can then no longer act on the pipe-retaining elastic ring. This neutralization of the push button is irreversible since the elastic teeth prevent any removal of the cartridge from its housing. In this second operating mode of the cartridge, the connection of the pipe to the cartridge is made permanent.

The push button advantageously has an enlarged head so as to make available a sufficient area of contact with the rim at the inlet of the housing. However, the contact area between the push button and the housing inlet rim can be minimal without thereby affecting the operation of the cartridge.

To enable the cartridge to be detached from its housing without damaging the support in which the housing is made, the present invention provides that the housing has an annular shoulder designed to form, when the cartridge is in a final insertion position in its housing, a stop for limiting the travel of the cartridge body, such that a salient edge of said shoulder comes to bear at the base of the elastic teeth, and that, when a predetermined threshold of thrust axially exerted at the base of the elastic teeth by this salient edge is reached, the elastic teeth deform plastically and irreversibly in such a way as to increase their inclination toward said second opening and no longer oppose the removal of the cartridge from the housing.

In this case, the cross section of the housing is advantageously invariable from the inlet of the housing to the annular shoulder forming the travel limit stop for the cartridge body.

To detach the cartridge, the operator exerts a strong axial thrust on the cartridge in the direction of the bottom of the housing. In reaction, the salient edge of the annular shoulder of the housing exerts an axial counter-thrust against the base of the elastic teeth, thereby deforming them plastically and permanently. Once the elastic teeth have been deformed in this way, their anchoring on the inner wall of the housing disappears, and it is possible to withdraw to cartridge from the housing.

The elastic teeth are advantageously cambered so as to form a cone frustum and fastened to a frustoconical end of the cartridge body, so as to form a clearance angle of about 15 to 20° between the elastic teeth and said frustoconical end of the cartridge body.

This clearance ensures that the irreversible deformation of the elastic teeth, under the counter-thrust of the salient edge of the annular shoulder of the housing, is sufficient so that the inclination of the teeth allows the removal of the cartridge.

The elastic teeth are, for example, the teeth of an elastic washer which is fastened, for example by snap-locking or crimping, to the cartridge body. In this case, the body of the cartridge is preferably produced from synthetic material and the elastic washer is advantageously made of metal, for example spring steel.

The invention also relates to a plate provided with at least one well serving as a housing for a cartridge as described above, and also to a pneumatic cylinder provided with such a cartridge.

BRIEF DESCRIPTION OF THE DRAWINGS

In any case, the invention will be clearly understood with the aid of the description below, with reference to the appended schematic drawing representing an exemplary embodiment of an implantation cartridge according to the invention, in which drawing.

DETAILED DESCRIPTION OF EMBODIMENTS

Figure 1:
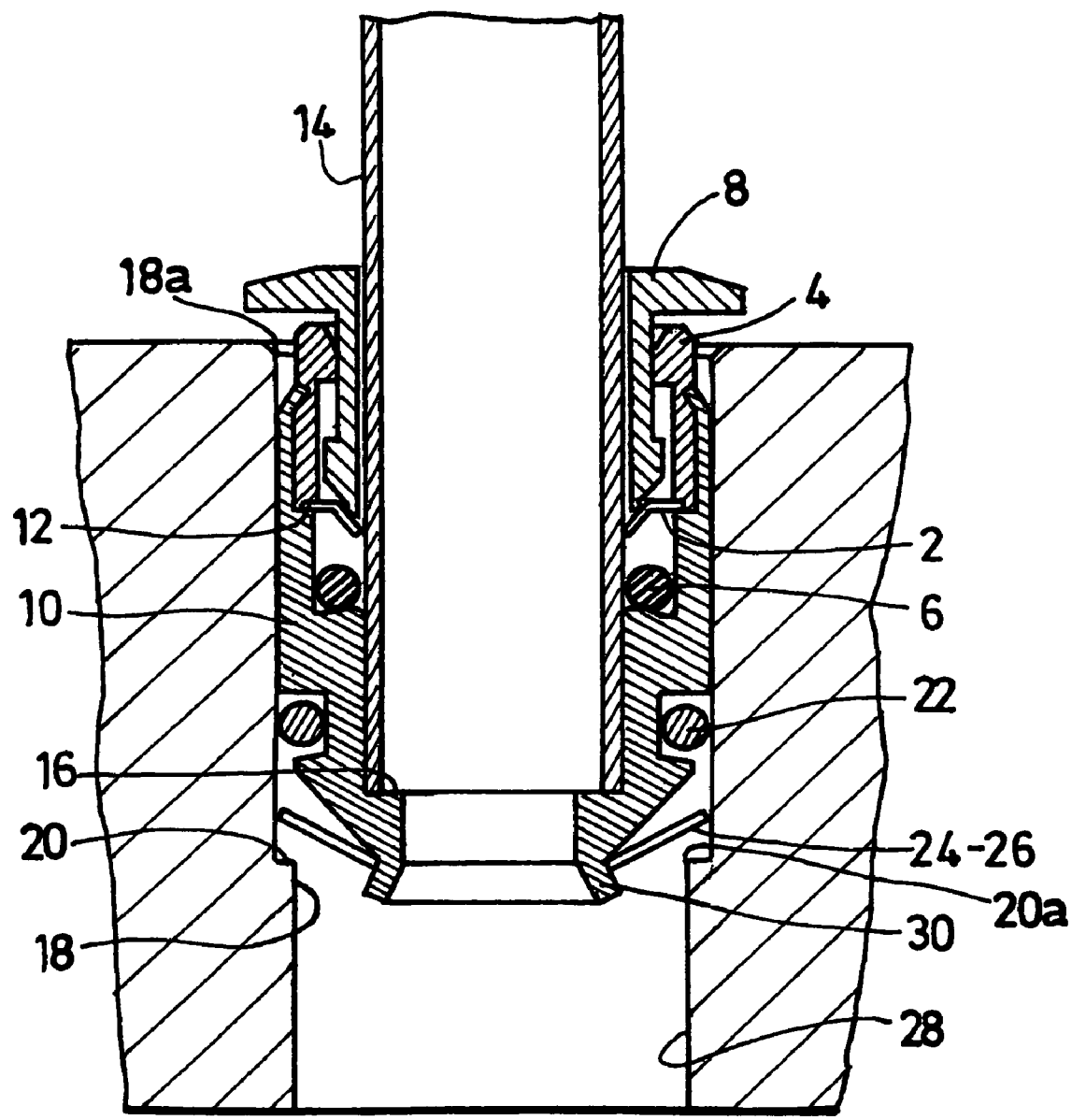
FIG. 1 is a view in longitudinal section of a cartridge according to the invention in a first position in a housing.

As indicated in FIG. 1, the implantation cartridge according to the invention is placed in a housing 18, made for example in a machine wall, in a connecting plate or else in a pneumatic cylinder. The housing 18 is the end of a duct 28 intended to be connected with the pipe 14. This duct 28 may, for example, be in communication with a source of compressed air or else a cylinder chamber.

The actual cartridge comprises a brass bush 10 constituting the body of the cartridge, a nitrile seal 22 and a stainless steel elastic washer 24 provided with teeth 26.

The seal 22 is housed in an annular groove formed in the outer surface of the bush 10. It allows sealing to be provided between the bush 10 and the inner wall of the housing 18.

The bush 10 has an overall circular cylindrical shape. It is open at its two ends. A first opening is intended to receive the pipe 14 to be connected, while the second opening is situated toward the duct 28, that is to say toward the bottom of the housing 18.

Figure 3:
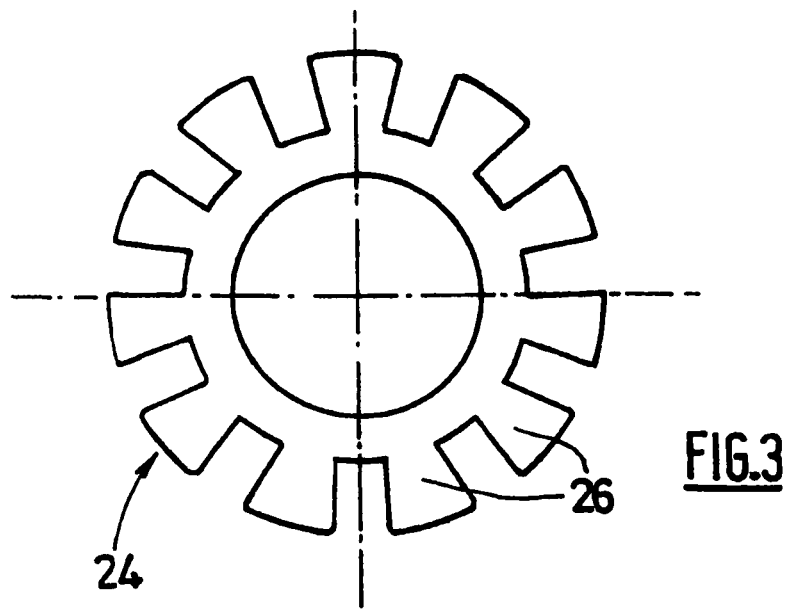
FIG. 3 is a plan view of an elastic washer used for the cartridge shown in the preceding figures.

The elastic washer 24 is represented in a plan view in FIG. 3. It has a thickness of between 0.2 and 0.3 mm in order to guarantee good tensile strength. The elastic washer 24 is fastened to a frustoconical end of the cartridge body 10 toward the second opening; in the mounted position, it is therefore located at the bottom of the housing 18.

The elastic washer 24 is cambered so as to take the form of a cone frustum, the camber angle being around 30 to 36° with respect to the radial plane. Owing to their difference in inclination, the frustoconical end of the cartridge body 10 and the washer 24 form a clearance angle of about 15 to 20°.

The bush 10 has, toward the bottom of the housing 18, a tubular projection 30 on which the washer 24 is positioned. To make the washer secure with the bush 10, the wall of the projection 30 is flared such that the washer 24 is no longer able to leave the projection 30.

In the case of the bush 10 being produced from a material having a high degree of elasticity, for example a synthetic material, it is also conceivable for the washer 24 to be snap-locked onto an annular projection of the bush, said projection being surmounted by an annular rib whose outside diameter is slightly greater than the inside diameter of the washer 24.

The teeth 26 extend radially and have an outwardly flared shape. When the washer 24 is mounted, the teeth 26 are oriented toward that opening of the bush 10 which is intended to receive the pipe 14 to be connected. The outside diameter of the washer 24, with the teeth in the rest position, is greater than the diameter of the housing 18 and than the outside diameter of the bush 10.

When the bush 10 is introduced into the housing 18, the teeth 26 are then more inclined with respect to the radial plane. Once in the housing 18, an anchoring phenomenon is established. It is not possible to withdraw the cartridge since, when pulling thereon to extract it from its housing 18, the teeth 26 produce a wedging effect and prevent any movement.

A quick coupling device is preferably situated on the first opening side of the bush 10. It comprises an elastic ring 2 having teeth extending radially toward the inside of the ring, a crimped or snap-locked sleeve 4 (other means of fastening, for example screwing, are likewise conceivable), a seal 6 and an acetal push button 8, these elements 2 to 8 being mounted in the bush 10 constituting the body of the cartridge.

The seal 6 comes to bear on a shoulder formed in the bush 10. The elastic ring 2 has an annular flange 12 which rests on a second inner shoulder of the bush 10. The sleeve 4 keeps the annular flange 12 in contact with the corresponding shoulder.

When a pipe 14 to be connected, made of synthetic material such as a polyamide, polyurethane, polyethylene, etc., or of metal, is introduced into the connection, it pushes the teeth of the elastic ring 2, which are inclined to allow such an introduction. The pipe 14 to be connected comes into abutment with a third inner shoulder 16 of the bush 10.

It is not possible to remove the pipe 14 by simply pulling on it in the axial direction, since the teeth of the elastic ring 2 are anchored in the pipe and, when such a pulling force is exerted, these teeth produce a wedging effect, preventing the removal of the pipe 14. The bush button 8 makes it possible to act on the teeth of the elastic ring 2 in order to release the pipe 14 from their hold and allow the removal of said pipe.

Figure 2:
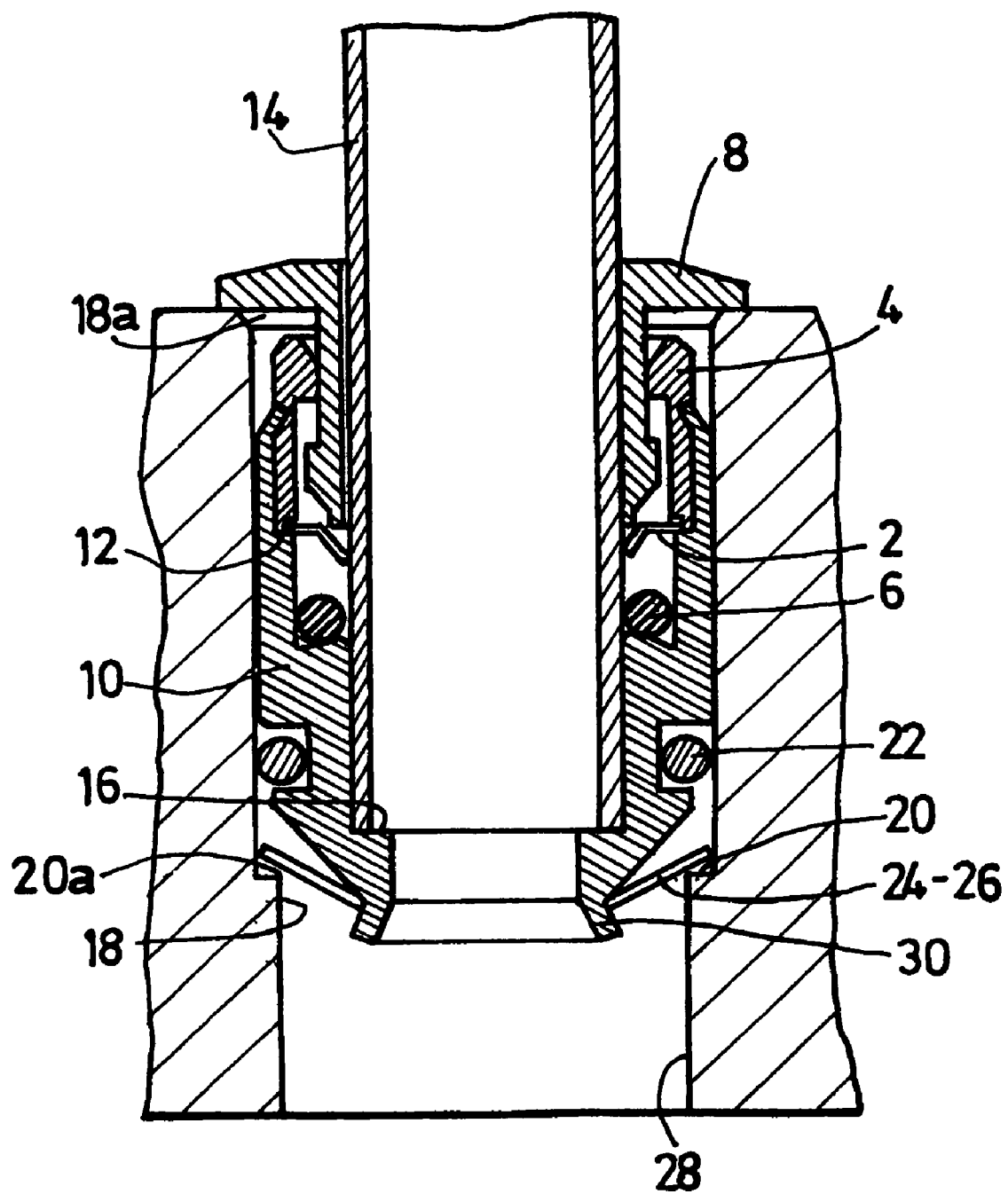
FIG. 2 is a similar view to FIG. 1 when the cartridge is in an intermediate insertion position in its housing.

FIG. 2 represents the cartridge when the cartridge is in an intermediate insertion position in its housing 18.

The inlet of the housing 18 has an annular rim 18a which, in this intermediate insertion position, forms a stop for limiting the axial travel of the push button 8. The push button 8 has an enlarged head so as to have available a sufficient area of contact with the rim 18a, in this case chamfered to facilitate the introduction of the cartridge into the housing 18.

The push button 8 is neutralized and is then no longer able to act on the teeth of the elastic ring 2 in order to release the pipe 14 from their grip. The connection of the pipe 14 to the cartridge is permanent and irreversible.

By contrast, as soon as this intermediate insertion position is reached, the push button butts against an annular rim formed at the inlet of the cartridge housing. This neutralization of the push button is irreversible since the elastic teeth prevent any removal of the cartridge from its housing. In this operating mode of the cartridge, the connection of the pipe to the cartridge is made permanent.

Thus, the cartridge according to the invention makes it possible, in a first operating mode, to produce a detachable connection (see FIG. 1), this connection being removable by acting on the push button 8 when it is free to travel axially in the direction of the ring 2, that is to say when the intermediate insertion position of the cartridge in its housing 18 is not yet reached.

When this intermediate insertion position is reached, the connection of the pipe 14 to the cartridge becomes permanent (see FIG. 2), since the push button 8 is neutralized.

The shift from the first operating mode (detachable connection) to the second operating mode (permanent connection) of the cartridge is produced very simply without resorting to any additional device for neutralizing the push button 8.

The invention also makes it possible to detach the cartridge from its housing 18 without damaging the wall, plate or cylinder in which the housing 18 is formed.

To this end, an annular shoulder 20 is provided in the housing 18 to form a stop for limiting the travel of the bush 10 and thus defines a final insertion position for the cartridge in its housing 18.

The cross section of the housing 18 is invariable from the inlet of the housing 18 to this annular shoulder 20 forming the insertion stop.

When the cartridge is in the final insertion position, a salient edge 20a of the shoulder 20 comes to bear against the base of the elastic teeth 26. Under the effect of a sufficiently strong axial thrust at the base of the elastic teeth 26 of the washer 24, these teeth are able to deform plastically and irreversibly in such a way as to increase their inclination toward that opening of the bush 10 which is intended to receive the pipe 14 to be connected. The angular clearance provided between the washer 24 and the cartridge body 10 allows this deformation.

To detach the cartridge, the operator exerts a strong axial thrust on the cartridge in the direction of the bottom of the housing 18. This thrust is transmitted at the base of the elastic teeth 26 by way of the salient edge 20*a* of the annular shoulder 20 of the housing 18.

Figure 4:
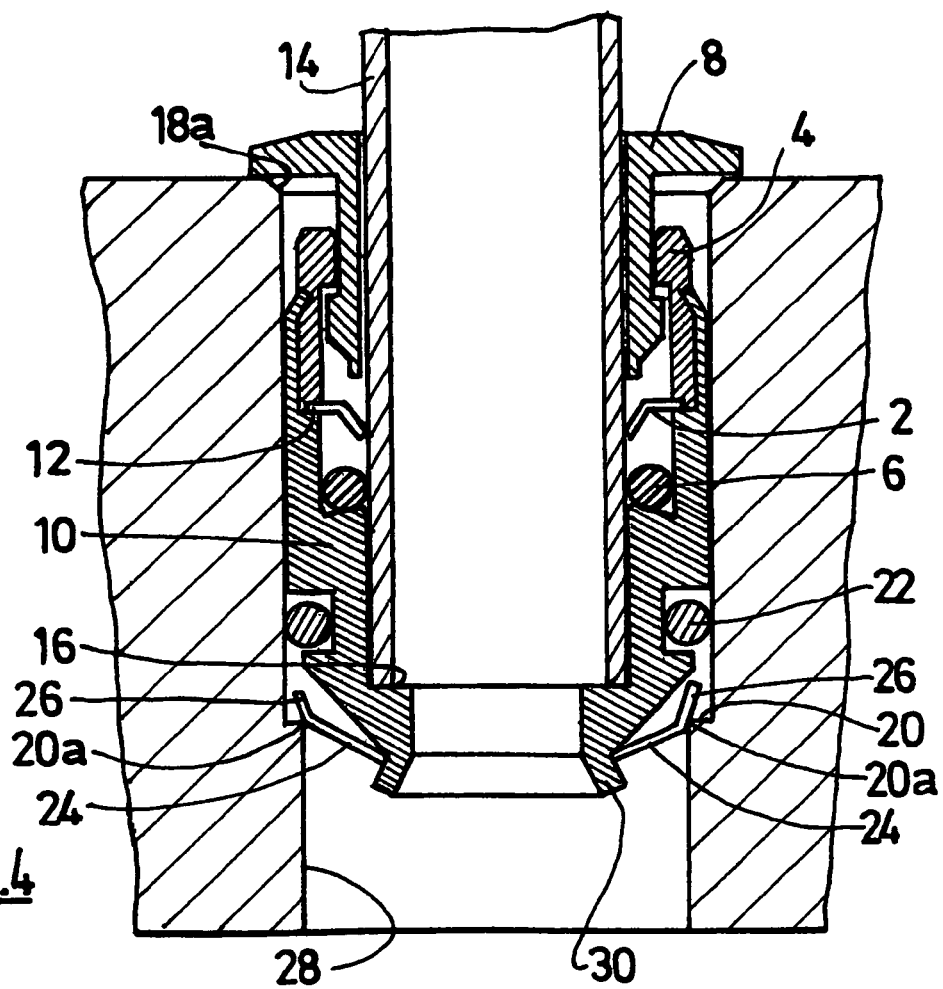
FIG. 4 is a similar view to FIGS. 1 and 2 of the cartridge in a final insertion position and in a configuration whereby the cartridge can be detached from its housing.

When this thrust reaches a predetermined threshold, for example about 400 N (that is to say much greater than the force required to insert the cartridge in its housing 18 during its assembly, which is, for example, about 80 N), the elastic teeth 26 deform and fold over inwardly in a plastic and permanent manner (see FIG. 4).

Once the elastic teeth 26 are thus deformed, their anchoring on the inner wall of the housing 18 disappears, and it is possible to withdraw the cartridge from the housing 18. All that is then required is to replace the worn washer 24 with a new elastic washer in order to be able to reuse the cartridge.

Thus, even though the connection between the pipe 14 and the cartridge is permanent, it is possible to detach the cartridge from its housing in a (slightly) disruptive manner, which as it were defines a third operating mode of the cartridge according to the invention.

As is self-evident, it would not constitute a particular departure from the scope of the invention, as defined in the appended claims:

- to use the same assembly principle for a plug intended to close an orifice in a pneumatic machine or in a connecting plate;
- to replace the elastic washer with teeth each fitted in the body of the cartridge, for example around a peripheral annular groove;
- to provide, in the case of a molding, for the elastic teeth to constitute an integral part of the body of the cartridge and to form only a single piece with this body.

The invention claimed is:

1. An implantation cartridge for a pipe connection designed to be fitted in a housing, comprising:
    a body of cylindrical general shape having a first opening connected to a duct and being provided with elastic teeth which extend radially outward, are inclined with respect to a radial plane toward a second opening provided for the introduction of a pipe to be connected, and are intended to be arranged preferably at the bottom of the housing; and
    a quick coupling for connecting the pipe to the cartridge, comprising an elastic ring having teeth which extend radially inward and come to bear against a shoulder formed on the inside of the cartridge body, a sleeve intended to keep the elastic ring in position, a seal to provide sealing between the outer surface of the pipe to be connected and the inner surface of the cartridge body, and an axially movable push button intended to act on the teeth of the elastic ring in order to be able to release a pipe retained in the connection;
    wherein the inlet of the housing has an annular rim designed to form, with the pipe in the connection end position and when the cartridge is in an intermediate insertion position in its housing, a stop for limiting the axial travel of the push button so as to make the connection of the pipe to the cartridge irreversible; and
    wherein the housing has an annular shoulder designed to form, when the cartridge is in a final insertion position in its housing, a stop for limiting the travel of the cartridge body, such that a salient edge of said shoulder comes to bear at the base of the elastic teeth, and when a predetermined threshold of thrust axially exerted at the base of the elastic teeth by this salient edge is reached, the elastic teeth deform plastically and irreversibly in such a way as to increase their inclination toward said second opening and no longer oppose the removal of the cartridge from the housing.

2. The implantation cartridge as claimed in claim 1, wherein the push button has an enlarged head so as to make available a sufficient area of contact with the annular rim at the inlet of the housing.

3. The implantation cartridge as claimed in claim 1, wherein the cross section of the housing is invariable from the inlet of the housing to the annular shoulder forming the travel limit stop for the cartridge body.

4. The implantation cartridge as claimed in claim 1, wherein the elastic teeth are cambered so as to form a cone frustum and fastened to a frustoconical end of the cartridge body, so as to form a clearance angle of about 15 to 20° between the elastic teeth and said frustoconical end of the cartridge body.

5. The implantation cartridge as claimed in claim 1, wherein the elastic teeth are the teeth of an elastic washer which is fastened, by snap-locking or crimping, to the cartridge body.

6. The implantation cartridge as claimed in claim 5, wherein the body of the cartridge is produced from synthetic material and in that the elastic washer is made of metal.

7. A plate provided with at least one well serving as a housing for an implantation cartridge as claimed in claim 1.

8. A pneumatic cylinder, wherein the pneumatic cylinder comprises at least one implantation cartridge as claimed in claim 1.

\* \* \* \* \*